United States Patent [19]

Kusama

[11] 3,870,836

[45] Mar. 11, 1975

[54] PORTABLE TESTER FOR TELEPHONE SUBSCRIBER LINES

[75] Inventor: Mikio Kusama, Urawa, Japan

[73] Assignee: Daimei Tsushin Sangyo Kabushiki Kaisha, Tokyo, Japan

[22] Filed: Jan. 31, 1974

[21] Appl. No.: 438,423

[30] Foreign Application Priority Data

Feb. 2, 1973 Japan ............................ 48-13880

[52] U.S. Cl. ........................ 179/175.3 R, 179/175

[51] Int. Cl. ........................................ H04b 3/46

[58] Field of Search 179/175.3 R, 175.2 D, 175.1 R, 179/175

[56] References Cited

UNITED STATES PATENTS

| | | | |
|---|---|---|---|
| 3,121,775 | 2/1964 | Amory et al. | 179/175.2 D |
| 3,627,932 | 12/1971 | Garrett et al. | 179/175 |
| 3,814,869 | 6/1974 | DeLuca | 179/175 |

*Primary Examiner*—William C. Cooper
*Assistant Examiner*—Douglas W. Olms
*Attorney, Agent, or Firm*—Robert Andrew Brown

[57] ABSTRACT

A portable tester for telephone subscriber lines equipped with line testing functions such as measurement of line insulation, line capacitance, loop or shortcircuit resistance, line voltages, and further having function for sending calling signal to a working subscriber either for an exclusive line subscriber or party line subscribers, supervising function for the answer of a called subscriber and communication facility with a working telephone subscriber telephone set or unworking telephone set or with a magneto-telephone set and also provided with a monitoring function in order not to disturbe a telephone in use.

3 Claims, 3 Drawing Figures

PORTABLE TESTER FOR TELEPHONE SUBSCRIBER LINES

BACKGROUND OF THE INVENTION

1. Field of the Invention

The present invention relates to a portable tester for telephone subscriber lines. More particularly, the present invention relates to a portable telephone line tester conveniently used in an installation work of telephone subscriber lines or the maintenance works for telephones for testing the line conditions, such as for instance, line insulation test, line capacitance test, detection of cross connection of lines, detection of open lines or ground, etc., without an aid of an exchange testboard operator. Further, the portable line tester may also be used in a cable connection work making a talk with an exchange testboard operator or an installer working at other site.

2. Description of the Prior Art

A telephone subscriber's line test, such as the insulation test, has usually been made from a testboard provided at an exchange. When an extensive telephone installation work is scheduled in which cable splicing works, subscriber telephone sets installing works, splicing works of a number of drop wires are carried out at a great number of the installation sites, the testboard operator becomes very busy since usually the number of the testboards is decided by considering an ordinary or daily maintenance condition of the relevant telephone exchange. It can be said that most probably only one or two testboards may be available for such test purposes at a time of a line installation work. Under such condition the workers at outside the exchange or at the cable side must wait for the turn to have test by the exchange testboard operator so that an efficient work cannot be expected.

SUMMARY OF THE INVENTION

The present invention has for its object to provide a portable tester, by which a workman on the line side can make various required tests without asking an aid of an exchange testboard operator.

The available tests intended by the present inventive tester are listed in below.

A. Up and down line test from subscriber telephone protector.
B. Up and down line test from a jumpering board.
C. Up and down line test from a terminal box on a pole.
D. Up and down line test from a terminal box of a rural telephone exchange.
E. Line test from an exchange main distribution frame.
F. Exchange line test from a subscriber station.

The items of the test handled by this tester is as follows.

a. Identification of $L_1$ and $L_2$ of the exchange line.
b. Simple measurement for the insulation or loop resistance.
c. Identification between an open circuit and an absence of the subscriber or identification of cable line length by measuring capacitance between a pair of lines.
d. Identification between cross-connection of lines and grounded connection.
e. Calling test for subscribers.

The tester can also be used as a calling telephone set for calling and speaking between an exchange and the cable installation site. By using the tester set, it is possible to make a test for lines without an aid of an exchange testboard operator and to connect a subscriber telephone set to a good cable pair.

DESCRIPTION OF THE PREFERRED EMBODIMENT

Figure 1:
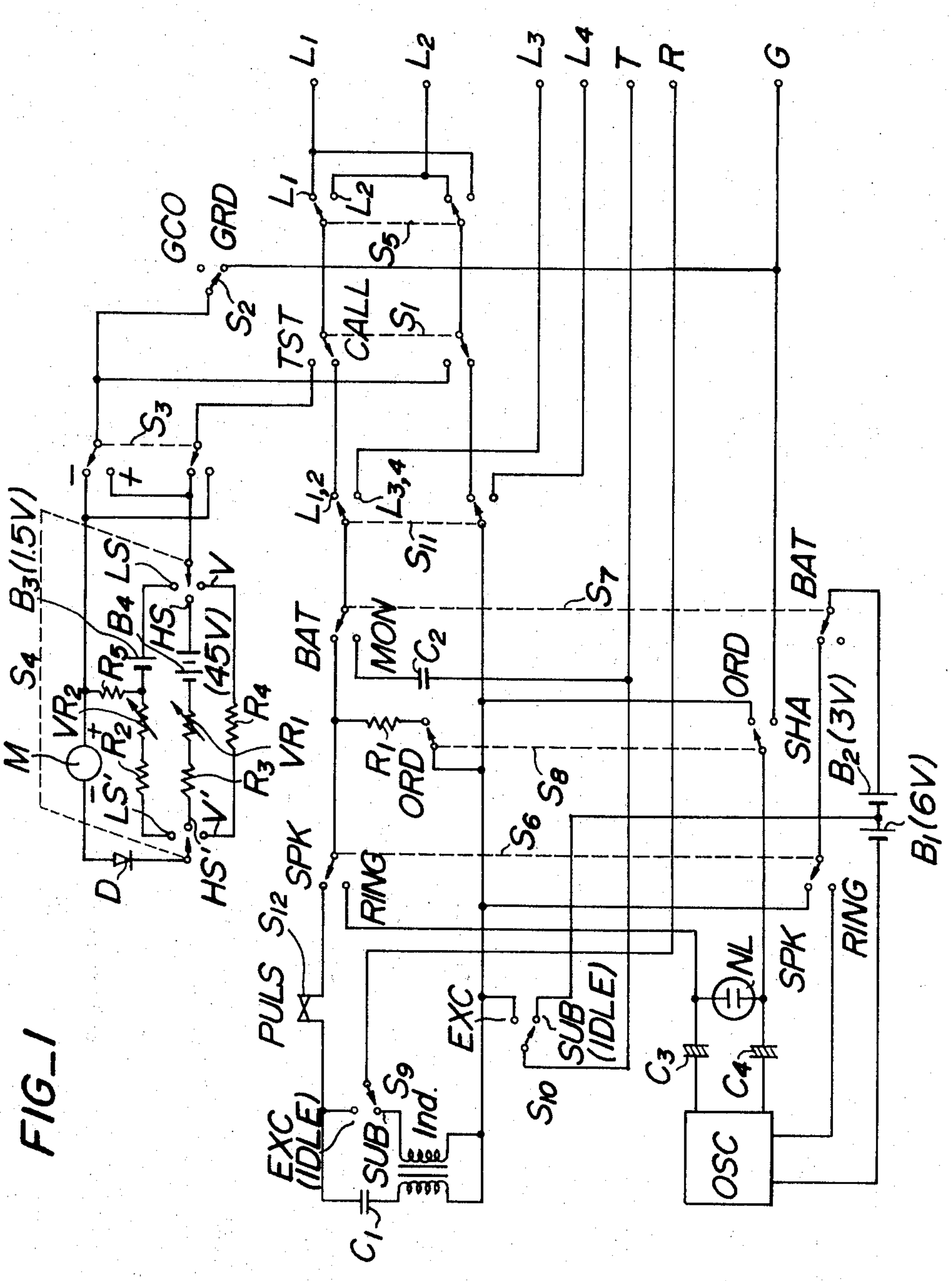
FIG. 1 illustrates circuit diagram of a portable tester made in accordance with the present invention.

FIG. 1 illustrates an embodiment of a circuit of a tester made in accordance with the present invention.

In FIG. 1, test terminals $L_1$ and $L_2$ are connected to a pair of telephone lines to be tested and a ground terminal G is grounded at the cable installation site or the like by suitable means such as for instance by using distribution terminal box. The terminals $L_1$ and $L_2$ are connected to fixed poles of a key $S_5$, which has a function to reverse the lines $L_1$ and $L_2$. This reverse key $S_5$ normally situated in the position as illustrated in the drawing "$L_1$," and connects the lines $L_1$ and $L_2$ to a further key $S_1$. This key $S_1$ has a test function and is given two positions "TST" (test) and "CALL" (call). The test key $S_1$ normally located to the "CALL" side. In the illustrated position "CALL" of the test key $S_1$, the lines $L_1$ and $L_2$ are connected to a conversation circuit of the tester which will be explained later.

By throwing the test key $S_1$ to the "TST" side, the lines $L_1$ and $L_2$ are connected to test circuit of the device. The test circuit includes further ground cutoff key $S_2$, + and − reverse key $S_3$ and HS-LS-V key $S_4$ and a meter and battery circuit. When throwing the test key $S_1$ to the TST side and the ground cutoff key $S_2$ to GCO side, the lines $L_1$ and $L_2$ are connected to a series circuit including a voltmeter M, a diode D, resistor $R_3$, a variable resistor $VR_1$, and a 45 V battery $B_4$ through two contacts HS and HS' of the key $S_4$. The meter M is a dc volt-meter having maximum range of 50 V and a rating of 200 $\mu$A and an inner resistance of 250 KΩ. The resistor $R_3$ is of 200 KΩ and $VR_1$ is 50 KΩ variable resistor at the maximum adjustment. The diode D has a protection function for the meter M. In this position of the keys, the insulation resistance between the lines $L_1$ and $L_2$ can be measured.

In case if the lines $L_1$ and $L_2$ are short-circuited the meter M will give nearly full scale indication by the 45 V primary battery $B_4$ housed in the device. When the short-circuit resistance between the lines $L_1$ and $L_2$ is to be measured more accurately, the key $S_4$ may be moved in LS position, in which the meter M is connected to a series circuit including a resistor $R_2$ and a variable resistor $VR_2$ both of 5 KΩ and a battery $B_3$ of 1.5 V. In this circuit the shortcircuit resistance can be read by a more lower scale. A shunt resistance $R_5$ of about 3.36 KΩ is provided just for adjusting the scale of the meter M.

By placing the key $S_4$ in position V, a 250 KΩ resistor $R_4$ is connected in series with the meter M and the existing voltage between the lines $L_1$ and $L_2$ can be measured. The meter M shows an indication when the line $L_1$ is negative and the line $L_2$ is positive. In case if the line $L_1$ is positive and the line $L_2$ is negative, either the key $S_5$ or $S_3$ may be put in the other position so that the voltage may be tested.

Voltage detection on either of the line $L_1$ or line $L_2$ may be effected by using the key $S_2$ having "GRD" (ground) and "GCO" (ground cutoff) position, while placing the key $S_4$ at V side. Negative battery potential on either of the line $L_1$ or $L_2$ may be measured by using $S_2$ key at GRD side, while placing the test key $S_1$ to the TST (test) side and key $S_4$ on V side.

Positive potential on either of the line $L_1$ or $L_2$ may be measured by throwing the key $S_3$ to + side from the above situation.

By using the test key $S_1$ in TST side, key $S_4$ in V side and the ground cutoff key $S_2$ GRD side, the lines $L_1$ and $L_2$ may be identified in case if they are unknown. For instance if the exchange is of a Strowger type, in an ordinary condition, the line $L_1$ is connected to ground through a resistance provided at the exchange and the line $L_2$ is connected to negative battery potential through a relay resistance provided at the exchange. Therefore, by the detection of a line showing negative potential, the line $L_2$ in the corresponding exchange may be identified.

In case if there is not potential or ground on the lines $L_1$ and $L_2$, capacitance between the lines $L_1$ and $L_2$ can be measured by placing the test key $S_1$ in TST side, key $S_4$ in HS side, and key $S_2$ in GCO side. This circuit is as same as the measurement of the insulation resistance between the lines $L_1$ and $L_2$. From this condition the reverse key $S_5$ may be thrown into $L_1$ or $L_2$ position alternately. By the charging and discharging current into and from the capacitance between lines $L_1$ and $L_2$, the capacitance between the lines may be assumed roughly and from the assumed capacity the cable length can be imagined, in case if the cable is open circuited. When a telephone set is connected, the condition is identified by an existence of about 2 $\mu$F capacitance due to a presence of condenser provided in its bell circuit.

Hereinafter, speach and ringing function of the tester may be explained. In this case the test key $S_1$ is thrown to position "CALL". Testman's headset, usually consists of a series circuit of a receiver and a microphone, is connected between T and R terminals of the tester device.

At first a ringing function of the tester may be explained under a consideration to send a ringing signal to an exclusive line or an ordinary subscriber connected between the terminals $L_1$ and $L_2$.

Figure 2:
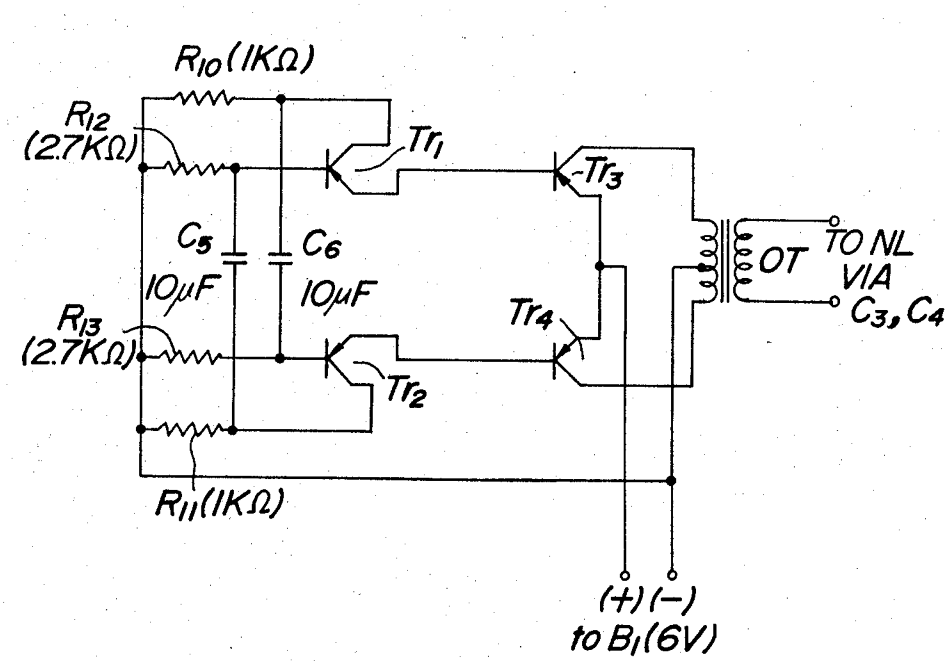
FIG. 2 is a circuit diagram of an oscillator constituting a part of circuit as illustrated in FIG. 1.
Figure 3:
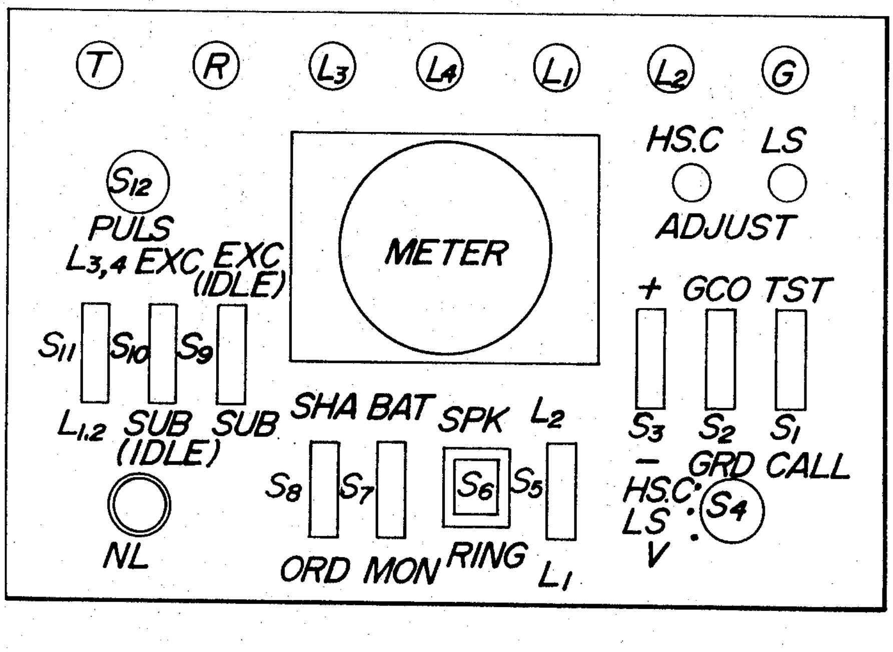
FIG. 3 is a practical outside view of one embodiment of a tester of the present invention.

By placing the key $S_1$ to CALL side, the lines $L_1$ and $L_2$ are connected to further key $S_{11}$ and then to speach and signaling circuit of the tester. The tester comprises an oscillator OSC producing about 16 to 25 Hz alternating current and of which detail is shown in FIG. 2. The oscillator comprises 4 transistors $Tr_1$ - $Tr_4$, 2 capacitors $C_5$ and $C_6$ of 10 $\mu$F, and resistor $R_{10}$-$R_{14}$ having values as indicated in the FIG. 2 and is fed from a housed battery of 6 V. This 6 V battery is supplied to the oscillator OSC by closing a speak-ring key $S_6$ to RING side. By the voltage supply, the oscillator oscillates in a known manner and produces. said 16–25 Hz ac current to the lines $L_1$ and $L_2$ through an output transformer OT, capacitors $C_3$, $C_4$ of about 10 $\mu$F and other RING contact of the key $S_6$. This ringing circuit is shunted by a neon lamp NL so that it is turned on. Furthermore, this circuit is shunted by a resistor $R_1$ of about 5 K$\mu$, which prevents a repeated excitation of markers in case of a crossbar or a common controlled exchange by definitely holding a current supply relay provided in a register of such exchange. Namely, the ringing to a subscriber can be sent without disconnecting the cable to the subscriber or in parallel to the exchange circuit and the subscriber circuit. This facility may greatly contribute in improving the efficiency of an outside workman.

When the called suubscriber answers, it can be identified by the fact of dimming down of the neion lamp NL. This visible indication affords a great utility of the tester. The conversation with the subscriber is possible through SPK contact of the key $S_6$. In this case, a key $S_9$ is put on SUB side and a key $S_{10}$ is also put to SUB (IDLE) side. The speach current to the testman's headset is supplied from the housed battery $B_2$ of 3 V through the following circuit.

$B_2$ (+) — $S_7$BAT — $S_6$SPK — Induction Coil IND — $S_9$SUB — R — headset — T — $S_{10}$SUB(IDLE) — $B_2$(−)

The current to the subscriber telephone is supplied from the exchange.

By supplying to the own headset by using a local battery $B_2$ of 3 V, it is possible to make the tester good work always and also there will be no need to consider for adjusting exchange current, which tends to become too large in short distance.

In the foregoing explanation, a key $S_7$ is considered to be in the indicated position designated as "BAT." In the other position of the key $S_7$ indicated as "MON", it provides monitoring function by connecting the testman's headset through a very small capacitor $C_2$, which preferably is of a value of 0.03 $\mu$F. When a cable terminals including possible working subscriber terminals, the test must at first be carried to put the key $S_7$ in the monitoring position MON in order that a disturbance with a working subscriber would not occur. By the very small value of the monitoring capacitor $C_2$ any working subscriber is not disturbed for any kind of use such as dialing, receiving signaling or in the conversation stage. After confirming an idle condition of a subscriber connected to terminals $L_1$ and $L_2$ the key $S_7$ should be put on BAT side in which the tester can send calling signal and make conversation.

When a party line subsriber is to be callled, a key $S_8$ having positions ORD and SHA should be placed to SHA side. The term SHA means shared service, i.e., the party line service and by putting the key $S_8$ to the SHA side the ringing signal derived from the oscillator OSC is sent between ground supplied from the terminal G and either one of the lines $L_1$ and $L_2$. In the illustrated key position the ringing signal is sent on line $L_1$. By reversing the key $S_5$ to $L_2$ side the signal may be sent on line $L_2$. Therefore, party line subscribers having the bell connected on either of the lines $L_1$ and $L_2$ may be called separately. The conversation with these subscriber is just as same as an ordinary subscriber.

For a conversation with a magneto-exchange subscriber, the key $S_9$ should be switched to EXC (IDLE) side and the key $S_{10}$ should also put on SUB (IDLE) side. By this arrangement 3 V battery $B_2$ supplies current to the testman's headset through the following circuit.

$B_2$ (−) — $S_{10}$SUB — terminal T — headset-terminal R —

$S_9$EXC — $S_{12}$PULS — $S_6$SPK — $S_7$BAT — $S_{11}L_{1,2}$— $S_1$CALL —

$S_5L_1$ — line $L_1$ — sub-telephone set — line $L_2$ — $S_5L_2$ —

$S_1$CALL — $S_{11}$ — $S_6$SPK — $S_7$BAT — $B_2$ (+)

Namely, the battery $B_2$ supplies for the own headset through subsribers' telephone set in series. By this circuit it is also possible to talk with a telephone set having no current supply from the exchange and having no local battery. This is for instance a case of new telephone installation work before connection of the exchange line. The same is applied for a case to speak with other line worker's telephone set having no current supply.

A key $S_{11}$ is provided to speak with another workman or exchange operator through other cable pair $L_3$ and $L_4$. By throwing the key $S_{11}$ to $L_{3,4}$ side and a same conversation function is given just as same as for the lines $L_1$ and $L_2$. In this situation the conversation through lines $L_3$ and $L_4$ may be carred while making tests on lines $L_1$ and $L_2$.

Furthermore a simple dialing facility is provided by using a pulse key $S_{12}$ having pulse contact PULS. Usually a telephone exchange is provided with a simple testboard calling facility by dial for instance, by a number "111" or "1111" so that by using the pulse key $S_{12}$, it is easy to send such pulse to call the testboard.

In a preferred embodiment of the present invention, the battery $B_1$ is made of unit No. 1 type while making battery $B_2$ as a part thereof. The battery $B_4$ is made of layer built type cell and battery $B_3$ is also a unit No. 1 type.

The tester according to the present invention can be made in a very compact size despite it has a various test and speach or signaling facilities.

According to the present invention the tests which costmary had been effected from an exchange testboard can be made at an installation site without an aid of the exchange testboard so that a great saving of the working time of the line workmen can be expected and further the operation load for the testboard operator can be descreased.

Accordingly, a great utility of the tester is expected in the field of telephone installing works.

The numerical values mentioned in the foregoing is just to help an understanding the explanation and the invention is not limited to such particular embodiments.

I claim:

1. A portable tester for telephone subscriber lines provided with subscriber line connecting terminals $L_1$ and $L_2$, further line connecting terminals $L_3$ and $L_4$, headset connecting terminals T and R and a ground wire connecting terminal G and further provided with a test circuit and a speech and ringing circuit, wherein the test circuit comprises;

a reverse key $S_5$ for reversing said lines $L_1$ and $L_2$, a first test key for connecting the lines $L_1$ and $L_2$ to the test circuit or to the speech and ringing circuit, a second test key $S_3$ for reversing said lines leading to a dc meter circuit, a dc meter circuit connected to said second test key $S_3$ and including further switching key $S_4$ for switching the meter circuit including a dc meter M in either of the following three circuits of the following, a series resistance circuit for measuring voltages between terminals of the meter circuit, a series high dc voltate circuit for measuring insulation resistance between the terminals, a series low voltage and low resistance circuit for measuring low resistance between the terminals, a further key $S_2$ for connecting ground from the ground terminal G to either side of the meter circuit by use of said second test key $S_3$; and the speech and ringing circuit comprises, an oscillator for producing about 16–25 Hz ac ringing voltage by an excitation of housed battery, a neon lamp shunt connected to an output circuit of the oscillator for supervising an answering condition of a called subscriber, a key $S_{11}$ for selectively connecting the lines $L_1$ and $L_2$ or lines $L_3$ and $L_4$ to said speech and ringing circuit, a monitoring key $S_7$ for inserting a monitoring condenser of small capacitance in series with the terminals T and R for connecting a headset in order to monitor the condition of line to be tested, a speech circuit to be fed by a local battery, key $S_9$ and $S_{10}$ for connecting said local battery to the line terminals, and a shunt resistor inserted in parallel with the output circuit of the ringing oscillator to prevent repeated excitation of relay groups provided in the exchange.

2. A portable tester for telephone subscriber lines as claimed in claim 1, further comprising a key $S_8$ for sending the ringing signal between the ground terminal and one of the subscriber line terminals.

3. A portable tester for telephone subscriber lines as claimed in claim 1, wherein the shunt resistor inserted in parallel with the ringing oscillator output is on the order of 5 KΩ for definitely holding an exchange relay after its excitation.

* * * * *